United States Patent [19]

Hager

[11] Patent Number: 4,464,324

[45] Date of Patent: Aug. 7, 1984

[54] APPARATUS AND METHOD FOR INJECTION MOULDING OF PLASTIC PARTS OF IRREGULAR SHAPE, HOLLOW OR UNDERCUT FORM

[75] Inventor: Daniel Hager, Saone et Loire, France

[73] Assignee: Ozen, France

[21] Appl. No.: 304,406

[22] Filed: Sep. 21, 1981

[51] Int. Cl.³ .................................................. B29C 1/08
[52] U.S. Cl. ...................................... 264/221; 264/317
[58] Field of Search ................................ 264/317, 221

[56] References Cited

U.S. PATENT DOCUMENTS 3,692,892  9/1972  Lemelson ............................ 264/317

FOREIGN PATENT DOCUMENTS 218037   10/1957  Australia ............................... 264/317
530249   12/1972  Switzerland ......................... 264/317
1250476  10/1971  United Kingdom ................ 264/317

Primary Examiner—James H. Derrington
Attorney, Agent, or Firm—Remy J. VanOphem

[57] ABSTRACT

The invention relates to a device and method of using the device and plastic injection molding processes. A mold is provided utilizing a core inside the injection cavity of the mold. The core is prior to insertion of the mold subjected to a sub-freezing atmosphere. The core is then placed in the mold cavity wherein is injected the plastic material to mold the plastic part substantially surrounding the core. A thin film of air is formed around the "core" at the time of the injection of the plastic material thereby providing a substantial increase in surface finish to the plastic molded part. The core is made from a material which when heated will melt prior to the melting of the plastic part so that the core and part are removed from the cavity and subjected to a heating step thereby enabling removal of the core from the part.

11 Claims, 5 Drawing Figures

APPARATUS AND METHOD FOR INJECTION MOULDING OF PLASTIC PARTS OF IRREGULAR SHAPE, HOLLOW OR UNDERCUT FORM

BACKGROUND OF THE INVENTION

1. Scope of the Invention

The present invention relates to a special process for carrying out injection molding of plastic parts which have hollow or irregularly shaped forms as well as undercut regions. The invention also concerns the core member which is used for carrying out the method. 2. Description of Prior Art Various methods using a destructable core for providing injection molded plastics parts which include hollow or undercut shapings are already known.

The difficulty of carrying out injection molding of such parts essentially resides in the accuracy of molding. The surface finish of the cores used must be excellent, and the core must not be able to become deformed at the actual time of injection.

One process which is known notably from French Pat. No. 1,366,921 consists of using cores in low melting point alloys. The disadvantages which are generally encountered when carrying out this process are as follows:

Since the melting point of the plastic material injected into the mold is greater than the melting point of the metal or the alloy of which the core is fabricated, balancing of the temperatures of the injected material and of the core presents a very significant obstacle to the usage of such a process.

The operation for recovering the core material by melting is a relatively slow process. It is necessary to reheat the complete core and injected plastic part combination at a temperature which must still be less than the melting point of the plastic material.

SUMMARY OF THE INVENTION

The invention has the objective of making it possible to provide, by the injection molding process parts in plastic material without the above-stated disadvantages being encountered.

A method according to the invention for carrying out injection molding of parts in plastic material having hollow or irregular and undercut shapes by making use of a low melting point metal core, is characterized in that the core is cooled to a low temperature before injecting the plastic material into the mold.

According to a further characteristic of the invention, the core is cooled to a low temperature as a result of its having spent a certain period of time in a freezing means. The temperature of the core at the actual time of the injection operation thus being of the order of −20° C. to −40° C., subjecting the core to a freezing temperature causes a thin film of air to form around the core at the actual time of injection which results in the plastic material being obtained with an improved surface finish.

According to yet a further characteristic of the invention, a core pin having large dimensions and made from a metal which is a good conductor of heat is placed inside the fusible core. This core pin is placed in contact with the metal injection mold, and provides for good transfer of heat away from the core during injection.

According to yet a further characteristic of the invention, the core is recovered after the injection operation by immersing the molded part and its core in a bath of boiling water or in a bath of hot liquid. The part and its core is then agitated until the latter has melted away.

According to a further characteristic of the invention, the elimination of the core is enhanced by employing a centrifuging operation. This is particularly applicable in the case of parts which are axially symmetrical, for example, for turbine parts.

A core which is employed to carry out the method according to the invention is characterized in that it is made up from a piece of metal of small thickness, which corresponds to the undercut shape of the part which is to be molded. The core is made from a low melting point alloy, arranged around a massive core pin having large dimensions and made from a metal which is a good conductor of heat, and has a relatively high melting point.

According to yet a further characteristic of the invention, electrical resistances are incorporated in the core, so that, in order to cause the core to melt, all that is required is to connect these resistances to a source of electrical current.

BRIEF DESCRIPTION OF THE DRAWINGS

The attached drawings, which are provided solely by way of non-limiting example, will aid the understanding of the teachings of the invention.

DETAILED DESCRIPTION OF THE PREFERRED EMBODIMENT

Figure 1:
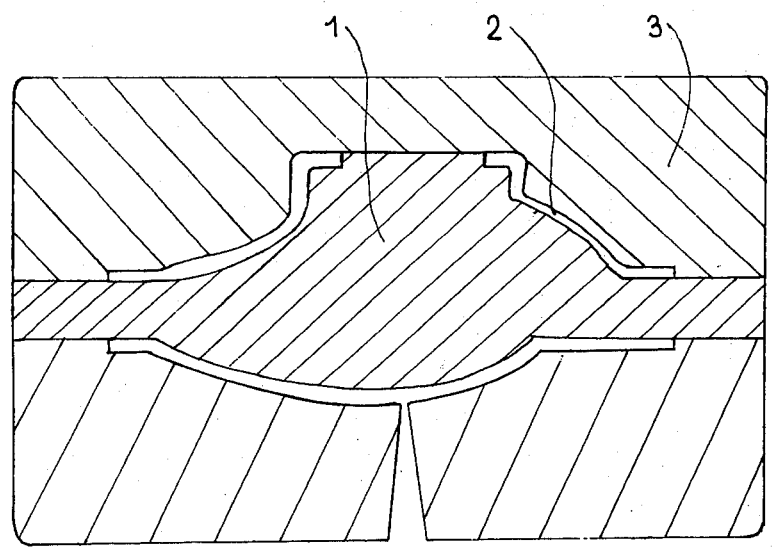
FIGS. 1 to 3 show a molded part and its core in cross-section within a mold. These Figures illustrate the successive steps of the method according to the invention.
Figure 2:
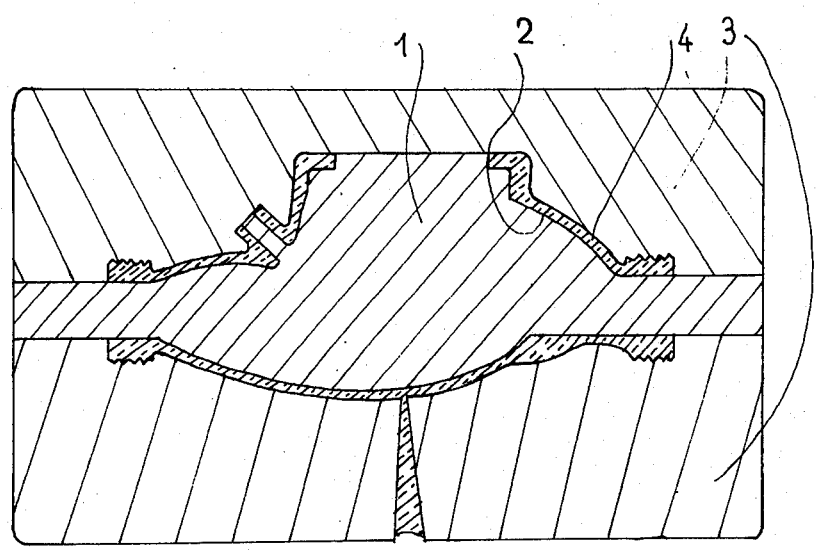
Figure 3:
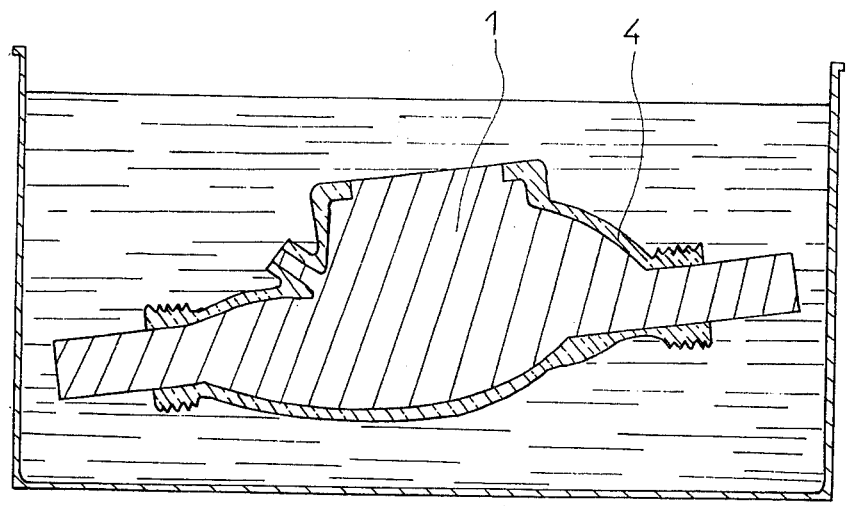

Using a known arrangement which is illustrated in FIG. 1, in order to carry out injection molding of a plastic part having hollow or irregular and undercut shapes, a core 1 having a low melting point is used which is arranged inside an injection cavity 2 of the mold 3. The plastic material is injected in the molten state into the space which is left around the core in order to obtain a molded part 4, shown in FIG. 2. In order to recover the core 1, it is melted by immersing the molded part 4 which has been molded around its core in a bath of boiling water, or alternatively in a bath of a hot liquid of an appropriate nature. The temperature of the bath is a function of the respective melting points of the core 1 and of the plastic material constituting the molded part 4.

According to the invented method, the core is brought to a low temperature before carrying out the injection operation, by, for example, placing the core in a freezing means so as to lower its temperature down to approximately −20° C. to −40° C. The method results in the following advantages:

The negative heat energy stored in the core prevents any softening of it while the core is in contact with the molten plastic material, thereby insuring that the exact geometry of the molded part will be preserved. It should be noted that the molten plastic material is injected at pressures which may reach 500 bars to 1000 bars, or even higher in the injection cylinder. Experience has shown that a thin film of air forms around the cold core at the time of injecting the plastic material. This thin film of air provides the molded part 4 with a good surface finish at the area of contact with the core 1.

By varying the composition of the alloy used for manufacturing the low melting point core, it is clearly possible to select a predetermined melting point. A high melting point would bring about the risk of damage being caused to the plastic molded part while a melting point which is too low could lead to deformation of the core during the injection operation. Such deformation is clearly harmful to the geometrical quality of the part molded around the core. The alloy is consequently selected on the basis of the plastic material used in the injection process.

Figure 4:
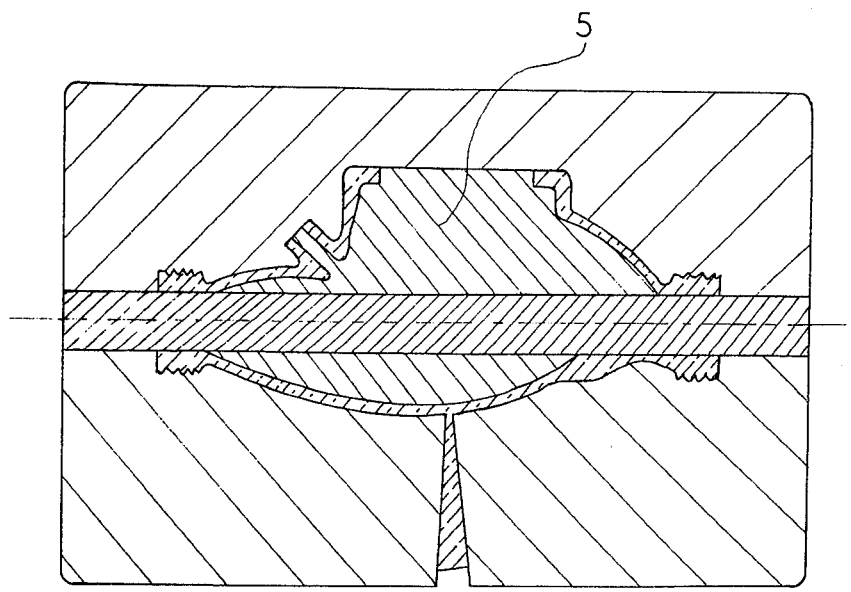
FIGS. 4 and 5 show the part and its core in cross-section within a mold, in accordance with alternative variants of the invention.

According to the invented method, it is also possible to use a core 5, as shown in FIG. 4, which is made up from a metal part, of small thickness, formed around a thick core pin 6 of large dimensions. The core pin 6 is made from an alloy which is a good conductor of heat, such as an aluminum alloy, and is itself in contact with the mold 3 thereby insuring that there is a good heat flow towards the mold. In this alternatively, the core pin 6 provides the mechanical support for the core.

According to yet a further alternative embodiment of the invention, the mold 3 may be a non-ferrous, non-cuprous alloy, and is preferably based on aluminum, as for example of the "AU4G" type, which provides the following advantages:

The mold is thus of good mechanical strength, the rigidity of the mold being a significant aspect of the molding process, bearing in mind the high injection pressures.

An aluminum alloy is easy to machine;

has a good coefficient of thermal conduction; and such an alloy does not adhere to the molten metal of the core, fusible metals do adhere onto ferrous or copper-based metals.

In order to decrease the time necessary for recovering the core by a melting process, the molded part and its core are agitated in the bath of hot liquid or boiling water, using alternating movements, or any other convenient movements.

Figure 5:
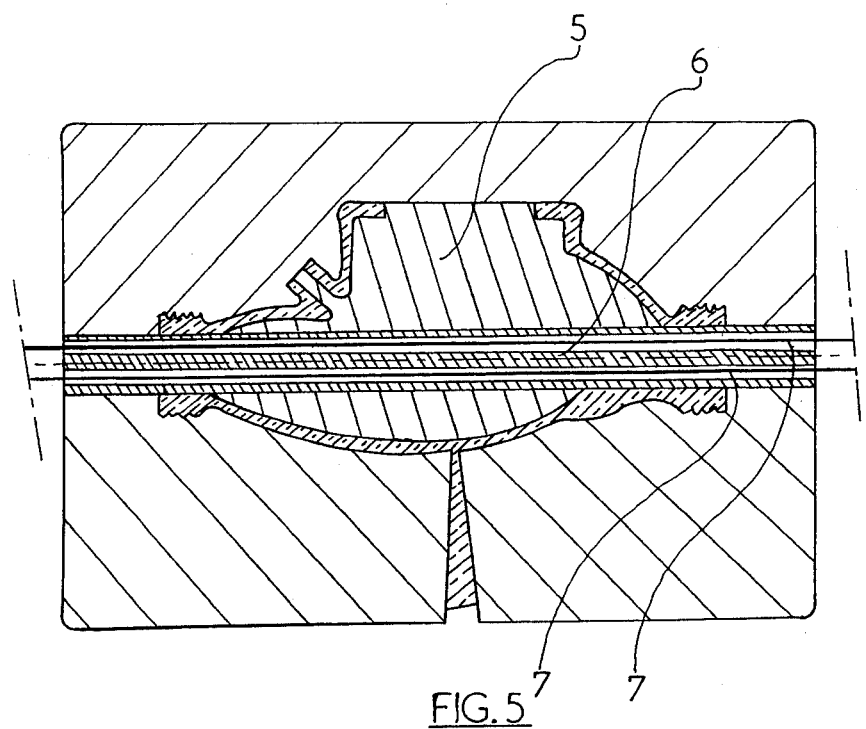

Also, electrical resistances 7 as shown in FIG. 5 may be incorporated into the core. In this case, in order to cause the core to melt, all that is needed is to connect these resistances to a source of electrical current.

The use of alternative embodiments which might suggest themselves to those skilled in the art would not lead to a departure from the scope of the present invention, such non-limiting variations being:

More rapid methods for melting the core may be used by distributing electrical resistances in the core or by using systems operating on induction, microwaves, Foucault currents, or simply by constructing the composite assembly in such a way as to allow a better flow of heat towards the core, as by conduction. This would notably make it possible to employ alloys having a higher melting point, either when this is necessary as a result of the type of plastic material used, or simply for the purpose of reducing the time duration of the operation for recovering the core.

With the objective in mind of still obtaining more rapid melting of the core, a system of the "heat exchanger" type may be utilized by inserting either a hollow core pin into the core, a finned tube, a tortuous passage, or any other hollow body into the core, through which it is possible to cause a hot fluid to circulate.

In order to economize on the fusible alloy, non-fusible material inserts could be inserted into the core which have low thermal inertia and are able to be extracted from the plastic material part through orifices formed in the latter. Such inserts may, for example, be provided by balls, or by metal plates.

In order to speed up the rate of manufacture, the core can be brought to a low temperature by immersing it in an enclosure containing a liquified gas.

When the melting point of the alloy used for providing the fusible part of the core is greater than 100° C., the core is advantageously recovered by immersing it in a bath of hot oil. While the invention has been described in connection with the preferred embodiments, it is to be understood that this description is not intended to be limited with respect to those embodiments. On the contrary, it is intended to cover all alternatives, modifications and equivalents, as may be included in the spirit and scope of the invention as defined by the appended claims.

I claim:

1. A method for injection molding hollow, irregularly shaped or undercut parts, the method comprising the steps of:

making a core from a material having a first predetermined melting point temperature;

cooling said core to a first predetermined temperature in a freezing means such that the temperature of said core at the actual time of the injection operation is between approximately $-20°$ C. and $-40°$ C., placing said core within an injection cavity of a mold;

injecting a liquid plastic material having a second predetermined melting point temperature higher than said first predetermined melting point temperature into said injection cavity so as to be substantially surrounding said core, said core providing a heat sink to draw the heat out of said liquid plastic material such that said liquid plastic material solidifies to form a solidified plastic part with the surface finish of the surface of said solidified plastic part immediately surrounding said core being significantly enhanced and whereby a thin film of air is formed on the outer surface of said core;

removing said core and solidified plastic part from said injection cavity within said mold; and heating said core to said first predetermined melting point temperature such that said core is melted away from said solidified plastic part.

2. The method as claimed in claim 1 wherein said heating step further comprises:

embedding an electrical resistance element in said core; and connecting said electrical resistance element to a source of electrical power such that a current through said electrical resistance element raises said core temperature to said first predetermined melting point temperature whereby said core melts away from said solidified plastic part.

3. The method as claimed in claim 1 wherein said heating step further comprises:

immersing said core and solidifed plastic part in a liquid bath having a second predetermined melting point temperature higher than said first predetermined melting point temperature; and agitating said core and solidified plastic part in said liquid bath such that said core is melted by the liquid in said liquid bath leaving said solidified plastic part intact.

4. The method as claimed in claim 1 wherein the step of making said core further comprises:

making a core pin from a heat conductive metal, said core pin having a first cylindrical portion;

making a core from a fusible material having a first predetermined melting point temperature; and mounting said core to said first cylindrical portion of said core pin such that a portion of the first cylindrical portion extends from said core, whereby said core pin provides the structural rigidity for said core and further provides a heat sink to draw the heat out of said core.

5. The method as claimed in claim 4 wherein the step of making a core pin from a heat conductive metal further comprises:

forming a hollow passage in said core pin;

mounting a heat exchanger in said hollow passage of said core pin;

circulating a liquid in said hollow passage; and circulating said liquid in said hollow passage of said core pin.

6. The method of claim 1 wherein said mold comprises an upper portion and a lower portion, said injection cavity being disposed between said upper and lower portions.

7. The method of claim 6 wherein said core further comprises:

a heat conductive circular metal core pin having a first predetermined outer diameter, said circular metal core pin being mounted interposed said upper and lower portions of said mold; and a fusible core mounted to said first predetermined outer diameter defining a cavity between said fusible core and said cavity of said mold, said circular metal core pin further having at least one end portion extending from said fusible core, said at least one end portion communicating with said upper and lower portions of said mold such that said circular metal core pin provides structural rigidity for the core and further creates a heat sink to draw the heat out of said fusible core.

8. The method of claim 1 wherein said core is comprised of a low melting point alloy.

9. The method of claim 1 wherein said mold is comprised of a non-ferrous material.

10. The method of claim 1 wherein said mold is comprised of a non-copper base.

11. The method of claim 8 wherein said low melting point alloy is aluminum.

* * * * *